United States Patent
Ito

(10) Patent No.: US 7,567,980 B2
(45) Date of Patent: Jul. 28, 2009

(54) REMOVABLE RECORDING MEDIUM AND FILE CONTROL METHOD THEREFOR

(75) Inventor: Hideki Ito, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 493 days.

(21) Appl. No.: 11/009,951

(22) Filed: Dec. 10, 2004

(65) Prior Publication Data

US 2005/0165727 A1 Jul. 28, 2005

(30) Foreign Application Priority Data

Dec. 16, 2003 (JP) ............................... 2003-417738

(51) Int. Cl.
G06F 17/30 (2006.01)
G06F 7/00 (2006.01)
G06F 12/00 (2006.01)

(52) U.S. Cl. .................. 707/104.1; 707/10; 707/9; 707/204; 711/100

(58) Field of Classification Search ............. 707/104.1, 707/9–10, 204; 711/100 S
See application file for complete search history.

(56) References Cited

U.S. PATENT DOCUMENTS

| | | | |
|---|---|---|---|
| 5,126,890 A | 6/1992 | Wade et al. | |
| 5,611,066 A * | 3/1997 | Keele et al. | 711/100 |
| 5,724,274 A | 3/1998 | Nelson et al. | |
| 6,502,164 B1 * | 12/2002 | Choi | 711/112 |
| 6,591,363 B1 * | 7/2003 | von Below | 713/2 |
| 6,973,467 B1 * | 12/2005 | Furusho | 707/205 |
| 7,117,492 B2 * | 10/2006 | Ikeda et al. | 717/170 |
| 2001/0025311 A1 * | 9/2001 | Arai et al. | 709/225 |
| 2002/0129262 A1 | 9/2002 | Kutaragi et al. | |
| 2003/0079096 A1 * | 4/2003 | Murakami | 711/156 |
| 2004/0204783 A1 * | 10/2004 | Thai | 700/94 |
| 2004/0225719 A1 * | 11/2004 | Kisley et al. | 709/212 |

FOREIGN PATENT DOCUMENTS

| | | |
|---|---|---|
| EP | 0 827 059 A | 3/1998 |
| WO | WO 01/20470 A1 | 3/2001 |
| WO | WO 02/15018 A | 2/2002 |

OTHER PUBLICATIONS

NFS Adminstration Guide, Sun Microsystems, Inc., 1994.*

* cited by examiner

Primary Examiner—Kuen S Lu
(74) Attorney, Agent, or Firm—Brinks Hofer Gilson & Lione

(57) ABSTRACT

A file control method for a removable recording medium including a recording medium portion and a controller for executing file access control on the recording medium portion is provided. The file structure of the recording medium portion is stored in the removable recording medium in a directory format, and a folder for each processing unit is written into the file structure. Then, when the removable recording medium is connected to a predetermined processing unit, only the folder corresponding to the predetermined processing unit can be viewed.

29 Claims, 15 Drawing Sheets

| NAME | PATH | ADDRESS |
|---|---|---|
| AAA.mp3 | / | 1357h |
| BBB.mp3 | / | 1AC8h |
| CCC.mp3 | / | 1FE9h |
| EEE.mp3 | /ABC/EFG/ | 3012h |
| FFF.mp3 | /ABC/EFG/ | 40DAh |
| GGG.mp3 | /ABC/EFG/ | 49CAh |
| JJJ.mp3 | /ABC/ | 5011h |
| KKK.mp3 | /ABC/ | 5739h |
| LLL.mp3 | /ABC/ | 60A0h |
| ⋮ | ⋮ | ⋮ |

REMOVABLE RECORDING MEDIUM AND FILE CONTROL METHOD THEREFOR

BACKGROUND OF THE INVENTION

1. Field of the Invention

The present invention generally relates to removable recording media and file control methods therefor, and more particularly, to a removable recording medium and a file control method that can achieve copyright protection.

2. Background Information

In a typical processing unit, such as a personal computer (PC), provided with a large-capacity storage device, such as a hard disk (HDD), processing results are written into the storage device, and data is read from the storage device and is processed when necessary. In this case, if an HDD 1 is fixed in a personal computer (PC) 2, as shown in FIG. 13, another PC cannot read and use data stored in the HDD 1, and thus, there is no copyright protection problems.

However, if an HDD is replaceable and portable (removable), as shown in FIG. 14, information on a removable HDD 4 recorded by a PC (PCA) 3 owned by user A can be read by another PC (PCB) 5 owned by user B, thereby causing copyright protection problems. For example, if the removable HDD 4 storing a file therein which is accessible only to the PCA 3 is installed in the PCB 5, the user B can read the file by using the PCB 5, thereby causing copyright protection problems.

Accordingly, the following measures are taken. An authentication number PC ID (PCA) of the PCA 3 and an authentication number HDD-ID (RM-HDD) of the removable HDD 4 that can be used by the PCA 3 are recorded, as shown in FIG. 15A, in the PCA 3 as authentication data, and an authentication number HDD-ID (RM-HDD) of the removable HDD 4 and an authentication number PC ID (PCA) of the PCA 3 that can use the removable HDD 4 are recorded, as shown in FIG. 15B, in the removable HDD 4 as authentication data. Only when both the PCA 3 and the removable HDD 4 are authenticated, can the PCA 3 use the removable HDD 4. With this configuration, the PCA 3 can use the removable HDD 4, in the situation shown in FIG. 14, while the PCB 5 cannot use the removable HDD 4, and thus, there are no copyright protection problems.

By erasing all of the information recorded on the removable HDD 4 to record authentication data shown in FIGS. 15C and 15D on the PCB 5 and the removable HDD 4, the PCB 5 can use the removable HDD 4, but in this case, the PCA 3 cannot use the removable HDD 4.

According to the definition of copyright, if an authorized user owns a plurality of personal computers, he/she can use any PC to write or read data into and from a removable HDD without presenting any problem. For example, user A having two PCs (PCA, PCA') 3*a* and 3*a*', as shown in FIG. 16, creates 20 pieces of music by using the PCA 3*a* and also creates 10 other pieces of music by using the PCA' 3*a*', and records the 30 pieces of music on the single removable HDD 4. The user A then installs the removable HDD 4 into an in-vehicle audio unit (ADU) 6 to listen to the 30 pieces of music.

In the method shown in FIGS. 15A through 15D, however, since authentication between PCs and removable HDDs is based on one-to-one correspondence, both music data in the PCA 3*a* and music data in the PCA' 3*a*' cannot be recorded on the same removable HDD 4. That is, when authentication between the PCA 3*a* and the removable HDD 4 is defined, as shown in FIG. 16, only the 20 pieces of music can be written into the removable HDD 4 and the user A cannot listen to the other 10 pieces of music stored in the PCA' 3*a*'. To write the 10 pieces of music stored in the PCA' 3*a*' into the removable HDD 4, the information concerning the usage of the removable HDD 4 by the PCA 3*a* stored in the removable HDD 4 should be completely erased, and then, the authentication data shown in FIGS. 15C and 15D are recorded on the PCA' 3*a*' and the removable HDD 4.

As described above, according to the one-to-one authentication method shown in FIGS. 15A through 15D, a user cannot write files, for example, music data, stored in a plurality of PCs into a removable HDD.

The user may also wish to write data recorded on a plurality of removable HDDs into a PC so as to process the data, for example, edit the data. According to the one-to-one authentication method shown in FIG. 15, however, data cannot be written into a single PC from a plurality of removable HDDs. For example, if authentication data shown in FIG. 17 is written into the PCA 3*a*, the PCA 3*a* cannot use a medium other than a removable HDD 4*a*, in other words, the PCA 3*a* cannot use a removable HDD 4*a*'.

Accordingly, a one-to-many authentication method for enabling the use of the removable HDD 4 in a plurality of PCs can be considered. For example, (1) the ID of the PCA 3*a* and the ID of the removable HDD 4 that can be used by the PCA 3*a* are recorded, as shown in FIG. 18A, in the PCA 3*a* as authentication data; (2) the ID of the PCA' 3*a*' and the ID of the removable HDD 4 that can be used by the PCA' 3*a*' are recorded, as shown in FIG. 18B, in the PCA' 3*a*' as authentication data; and (3) the ID of the removable HDD 4 and the IDs of the PCA 3*a* and the PCA' 3*a*' that can use the removable HDD 4 are recorded, as shown in FIG. 18C, in the removable HDD 4.

With this arrangement, the removable HDD 4 can be installed into each of the PCA 3*a* and the PCA' 3*a*' so that the user can record data, for example, music data, created by using the PCA 3*a* and the PCA' 3*a*' on the removable HDD 4 and listen to the music with an audio unit. For example, the user first installs the removable HDD 4 into the PCA 3*a*, as shown in FIG. 19, and records the 20 pieces of music data created by the PCA 3*a* on the removable HDD 4. The user then installs the removable HDD 4 into the PCA' 3*a*' and records the 10 pieces of music data created by the PCA' 3*a*' on the removable HDD 4, and then installs the removable HDD 4 into the audio unit (ADU) 6. This enables the user to play back and listen to the 30 pieces of music data with the audio unit 6.

In the one-to-many authentication method shown in FIGS. 18A through 18C, when the PCA 3*a* is authenticated, the PCA 3*a* can access all files recorded on the removable HDD 4, in other words, the PCA 3*a* can access files created by the PCA' 3*a*'. Similarly, when the PCA' 3*a*' is authenticated, the PCA' 3*a*' can access all the files recorded on the removable HDD 4, in other words, the PCA' 3*a*' can access files created by the PCA 3*a*. If the user of the PCA 3*a* and the user of the PCA' 3' are the same user, there is no copyright protection problem. However, if the users of the two PCs are different and if one of the users is dishonest, copyright protection problems may occur. For example, the user B of the PCA' 3*a*' may use the files recorded on the removable HDD 4, which are accessible only to the user A of the PCA 3*a*, without permission from the user A. Likewise, the user B may use the files recorded on the removable HDD 4 created by the user A of the PCA 3*a* without permission from the user A.

Another known copyright protection method is disclosed in Japanese Unexamined Patent Application Publication No. 2002-6978. When work is suspended, data in the memory of a PC is stored in an external storage device, and the stored data is reconstructed by entering a password to continue the work.

However, in the invention disclosed in the above publication, the copyright of files written into a removable HDD cannot be protected.

SUMMARY OF THE INVENTION

Accordingly, it is an object of the present invention to allow individual processing units to use a removable recording medium and also to achieve copyright protection by preventing a processing unit from using files on the removable recording medium recorded by other processing units.

It is another object of the present invention to allow each processing unit to write files recorded on a plurality of removable recording media into the processing unit while ensuring copyright protection.

In order to achieve the above-described objects, according to one aspect of the present invention, there is provided a file control method for a removable recording medium including a recording medium portion and a controller for executing a file access control on the recording medium portion. The file control method includes: storing a file structure of the recording medium portion in the removable recording medium in a directory format and writing a folder for a processing unit into the file structure; and performing viewing control when the removable recording medium is connected to a predetermined processing unit so as to allow the predetermined processing unit to use only files belonging to the folder corresponding to the predetermined processing unit and to write files created by the predetermined processing unit to the folder.

The above-described viewing control may be performed by: checking the ID of the predetermined processing unit when the removable recording medium is connected to the predetermined processing unit; and by viewing the folder corresponding to the predetermined processing unit when the ID has been obtained or by defining, when the ID has not been obtained, a new folder corresponding to the predetermined processing unit and connecting it to a root directory of the file structure so as to view the new folder.

According to another aspect of the present invention, there is provided a removable recording medium attachable and detachable to and from a processing unit. The removable recording medium includes: a recording medium portion storing a file therein; a unit for storing a file structure of the recording medium portion in the recording medium portion in a directory format and for writing a folder for a processing unit into the file structure; a storage unit for storing an association between a processing unit and a corresponding folder therein; and a viewing controller for performing viewing control when the removable recording medium is connected to a predetermined processing unit so as to allow the predetermined processing unit to use only files belonging to the folder corresponding to the predetermined processing unit and to write files created by the predetermined processing unit to the folder.

The above-described viewing controller may include: a unit for checking the ID of the predetermined processing unit when the removable recording medium is connected to the predetermined processing unit; a unit for viewing the folder corresponding to the predetermined processing unit when the ID has been obtained; and a unit for defining, when the ID has not been obtained, a new folder corresponding to the predetermined processing unit and connecting the new folder to a root directory of the file structure so as to view the new folder.

According to the aforementioned aspects of the present invention, the file structure of the recording medium portion is stored in a directory format, and a folder for a processing unit is contained in the file structure. When the removable recording medium is connected to a predetermined processing unit, only folders corresponding to the predetermined processing unit are viewed. With this configuration, the processing unit cannot access files on the removable recording medium recorded by other processing units, thereby preventing copyright protection problems. The processing unit can use desired removable recording media, and unlike the related art, the setting of authentication relationships is not necessary, thereby improving the operability.

Additionally, the processing unit can write files recorded on a plurality of recording media into the processing unit and process them while ensuring copyright protection.

According to still another aspect of the present invention, there is provided a file control method for a removable recording medium including a recording medium portion and a controller for executing a file access control on the recording medium portion. The file control method includes: dividing the removable recording medium into a plurality of partitions and assigning a partition to a processing unit; and performing viewing control when the removable recording medium is connected to a predetermined processing unit to allow the predetermined processing unit to use only files stored in its assigned partition and to store files created by the predetermined processing unit in the assigned partition.

The above-described viewing control may be performed by: checking the ID of the predetermined processing unit when the removable recording medium is connected to the predetermined processing unit; and by viewing the partition assigned to the predetermined processing unit when the ID has been obtained or by assigning an available partition to the predetermined processing unit when the ID has not been obtained so as to view the assigned partition.

According to a further aspect of the present invention, there is provided a removable recording medium attachable and detachable to and from a processing unit. The removable recording medium includes: a recording medium portion storing a file; a unit for dividing the recording medium portion into a plurality of partitions and for assigning a partition to a processing unit; a storage unit for storing an association between a processing unit and a partition assigned to the processing unit; and a viewing controller for performing viewing control when the removable recording medium is connected to a predetermined processing unit so as to allow the predetermined processing unit to use only files stored in its assigned partition and to store files created by the predetermined processing unit in the assigned partition.

The above-described viewing controller may include: a unit for checking the ID of the predetermined processing unit when the removable recording medium is connected to the predetermined processing unit; a unit for viewing the partition assigned to the predetermined processing unit when the ID has been obtained; and a unit for assigning an available partition to the predetermined processing unit so as to view the assigned partition when the ID has not been obtained.

According to the aforementioned aspects of the present invention, the removable recording medium is divided into a plurality of partitions, and a partition is assigned to a processing unit. When the removable recording medium is connected to a predetermined processing unit, viewing control is performed to allow the predetermined processing unit to use only files stored in its assigned partition and to store files created by the predetermined processing unit in the assigned partition. With this configuration, the processing unit cannot access files on the removable recording medium recorded by other processing units, thereby preventing copyright protection problems. The processing unit can use desired removable recording media as long as a partition is available, and unlike the related art, the setting of authentication relationships is not necessary, thereby improving the operability.

Additionally, the processing unit can write files recorded on a plurality of recording media into the processing unit and process them while ensuring copyright protection.

According to the present invention, for a vehicle processor, a folder is preset or a partition is reserved, thereby allowing the vehicle processor to reliably access the removable recording medium.

DESCRIPTION OF THE PREFERRED EMBODIMENTS

The present invention is described in detail below with reference to the accompanying drawings through illustration of preferred embodiments.

First Embodiment

An overview of a first embodiment of the present invention is described below with reference to FIGS. 1 and 2. In a removable HDD 10, associations 91 between PCs 11 through 13 and folders (directories) are stored. The associations 91 are stored in the removable HDD 10 when the removable HDD 10 is connected to one of the PCs 11 through 13. A folder specially for ripping in a vehicle is preset.

When the removable HDD 10 is connected to a predetermined PC (for example, PC 11), a viewing controller (not shown) of the removable HDD 10 obtains an authentication number (PC ID: 0001) from the PC 11. If the authentication number has already been obtained, the viewing controller views only folder 4 corresponding to the PC 11. If the authentication number has not been obtained, in other words, if the removable HDD 10 is first connected to the PC 11, the viewing controller defines a new folder 4 and connects it to the root directory in the file structure, and also views only the new folder 4. To view a folder means to allow a processing unit to access files only belonging to the viewed folder and to control files created by the processing unit to belong to that folder. In this manner, the other PCs 12 and 13 and other folders (folders 5 and 6 and folder 7 specially for ripping in a vehicle) are not viewed, thereby preventing the PC 11 from accessing files created by the other PCs.

The above-described control is also applied when the removable HDD 10 is connected to the PC 12 or 13, thereby preventing copyright protection problems.

Figure 1:
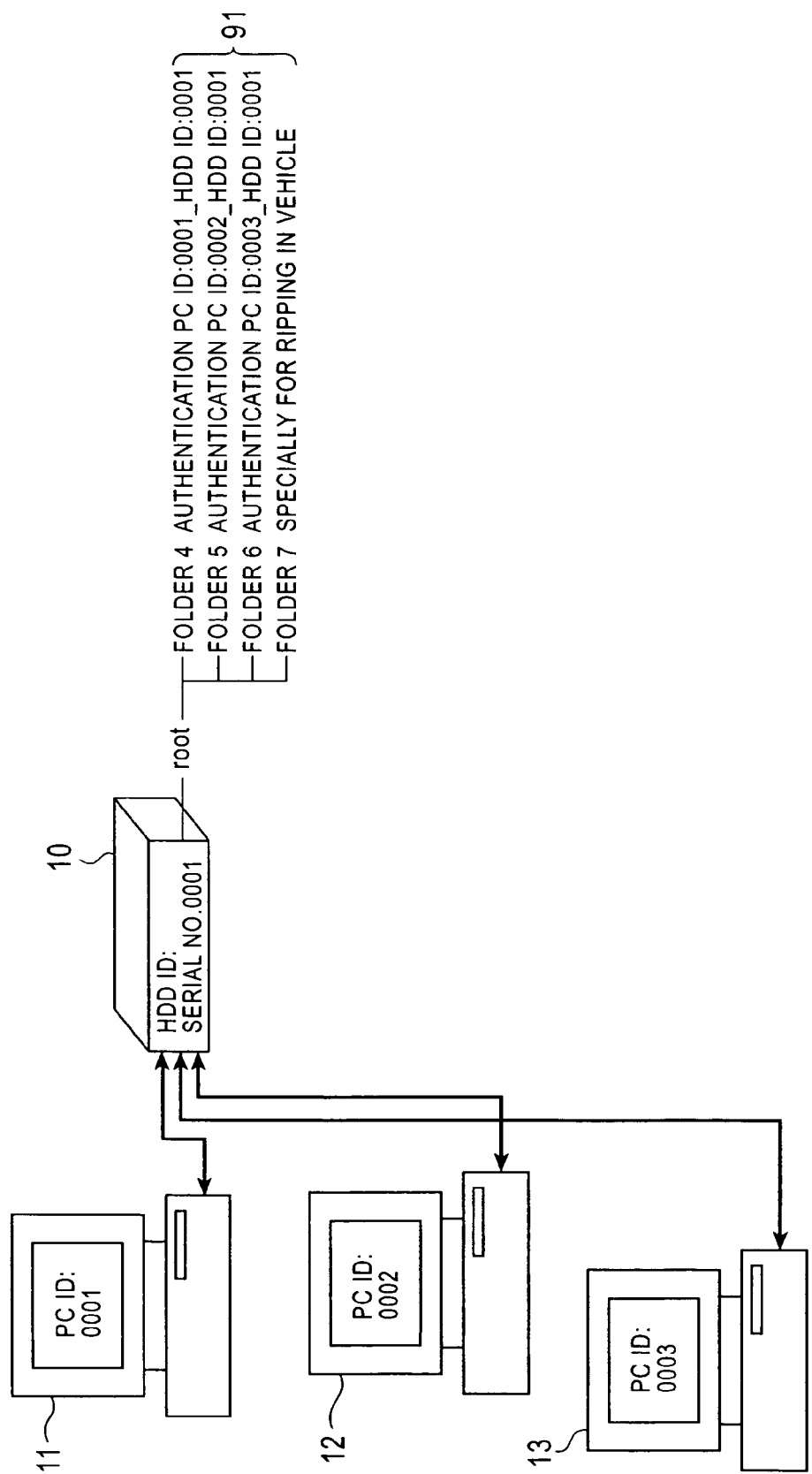
FIG. 1 is a schematic diagram illustrating one mode of a first embodiment of the present invention.
Figure 2:
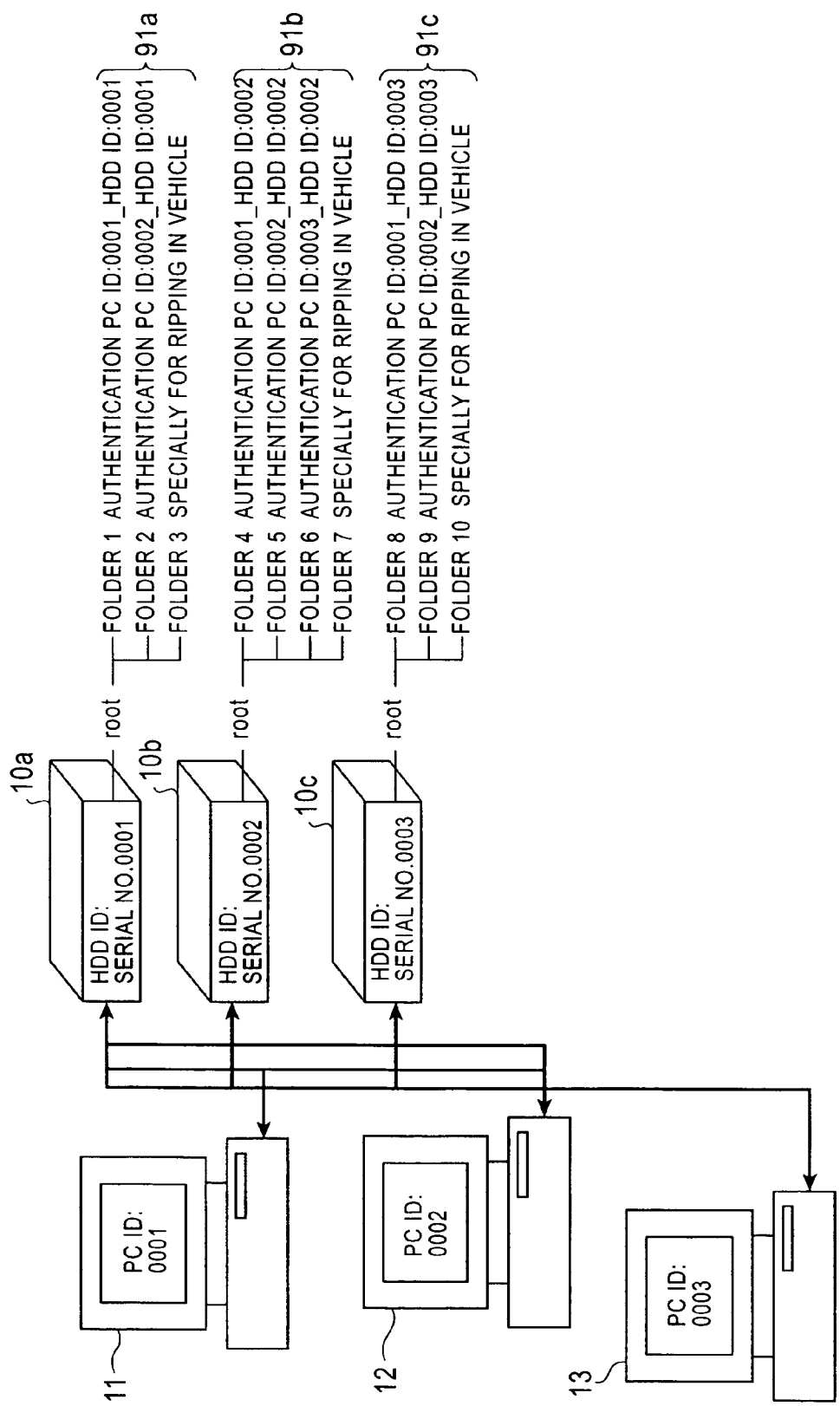
FIG. 2 is a schematic diagram illustrating another mode of the first embodiment of the present invention.

Although the number m of removable HDDs is 1 and the number n of processing units (PCs) is 3 in FIG. 1, the numbers m and n may be different. In the example shown in FIG. 2, m is 3 and n is 3. Associations 91a between folders (directories) and the PCs 11 through 13 are stored in a removable HDD 10a; associations 91b between folders and the PCs 11 through 13 are stored in a removable HDD 10b; and associations 91c between folders and the PCs 11 through 13 are stored in a removable HDD 10c. The associations 91a, 91b, and 91c are stored in the corresponding removable HDDs 10a, 10b, and 10c, respectively, when the removable HDDs 10a, 10b, and 10c are connected to the corresponding PCs. Folders for ripping in a vehicle are preset.

According to the associations 91a, 91b, and 91c, music data viewed when the removable HDDs 10a, 10b, and 10c are connected to the PC 11 are pieces of music in folder 1 of the removable HDD 1a (HDD ID Serial No. 1), folder 4 of the removable HDD 10b (HDD ID Serial No. 2), and folder 8 of the removable HDD 10c (HDD ID Serial No. 3), and the other folders are not viewable. Music data in the folders for ripping in a vehicle is always unviewable.

Music data viewed when the removable HDDs 10a, 10b, and 10c are connected to the PC 12 are pieces of music in folder 2 of the removable HDD 10a (HDD ID Serial No. 1), folder 5 of the removable HDD 10b (HDD ID Serial No. 2), and folder 9 of the removable HDD 10c (HDD ID Serial No. 3), and the other folders are not viewable.

Music data viewed when the removable HDDs 10a, 10b, and 10c are connected to the PC 13 are only pieces of music in folder 6 of the removable HDD 10b (HDD ID Serial No. 2), and the other folders are not viewable.

Figure 3:
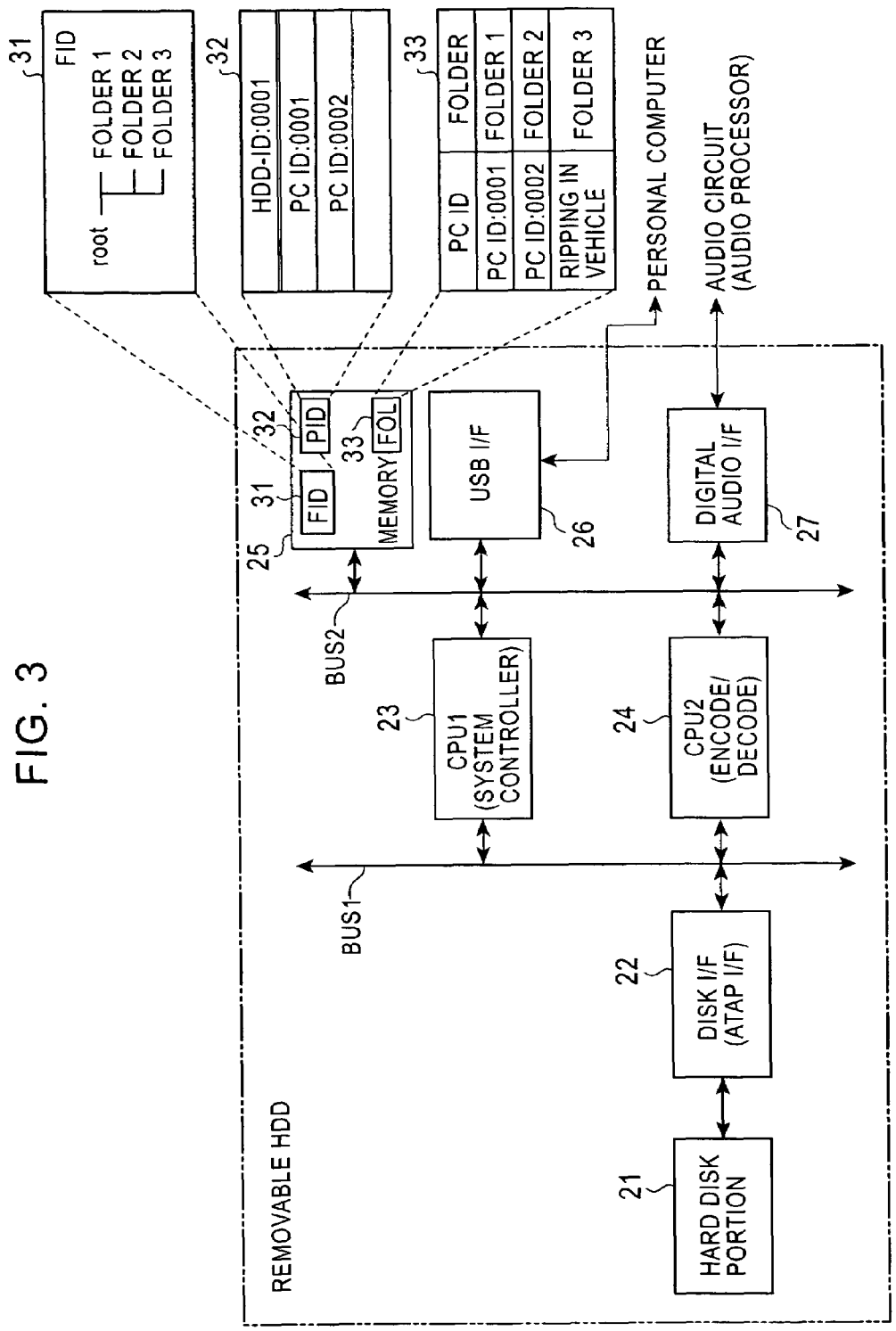
FIG. 3 illustrates a removable HDD of the first embodiment.

The removable HDD 10 of the first embodiment shown in FIG. 3 includes an HDD portion 21, a general disk interface (I/F) 22, such as ATAPI IF, a processor (CPU1) 23 for controlling the overall removable HDD, a processor (CPU2) 24 for encoding/decoding music data (files), a memory 25 for storing various data, a universal serial bus (USB) interface 26 for controlling interfaces with PCs connected via USB cables, and a digital audio interface 27 for controlling interfaces with audio circuits (audio processors). These elements are connected with each other via buses (BUS1 and BUS2).

The memory 25 includes a storage device (FID) 31 for storing file structure data, a storage device (PID) 32 for storing PC authentication numbers (PC ID: 0001, PC ID: 0002) obtained from previously connected PCs, and a storage device (FOL) 33 for storing the associations between the PCs and folders.

Figures 4, 5:
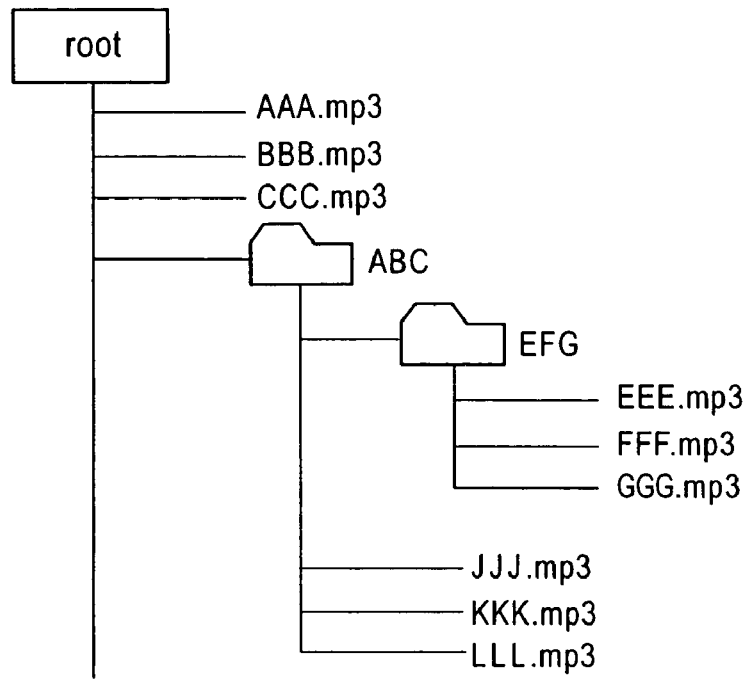
FIG. 4 illustrates a file structure in an HDD.
FIG. 5 illustrates file structure data.

FIG. 4 illustrates a file structure in the HDD portion 21. The root directory consists of at least one MP3 music file (in FIG. 4, three MP3 music files AAA.mp3, BBB.mp3, and CCC.mp3) and at least one directory (folder) (in FIG. 4, one directory ABC). The folder ABC consists of one subfolder EFG and a plurality of MP3 music files JJJ.mp3, KKK.mp3, and LLL.mp3, and the subfolder EFG consists of a plurality of MP3 music files EEE.mp3, FFF.mp3, and GGG.mp3. The file structure in the HDD portion 21 can be determined by analyzing volume descriptors, and as a result, file structure data (paths and head addresses of MP3 music files), such as that shown in FIG. 5, can be obtained and is stored in the storage device (FID) 31.

By using the file structure data shown in FIG. 5, a desired MP3 music file can be played back, and by designating a folder, only music files belonging to this folder can be played back. In this embodiment, folders (directories) 1, 2, and 3 are created and are connected to the root directory.

Figure 6:
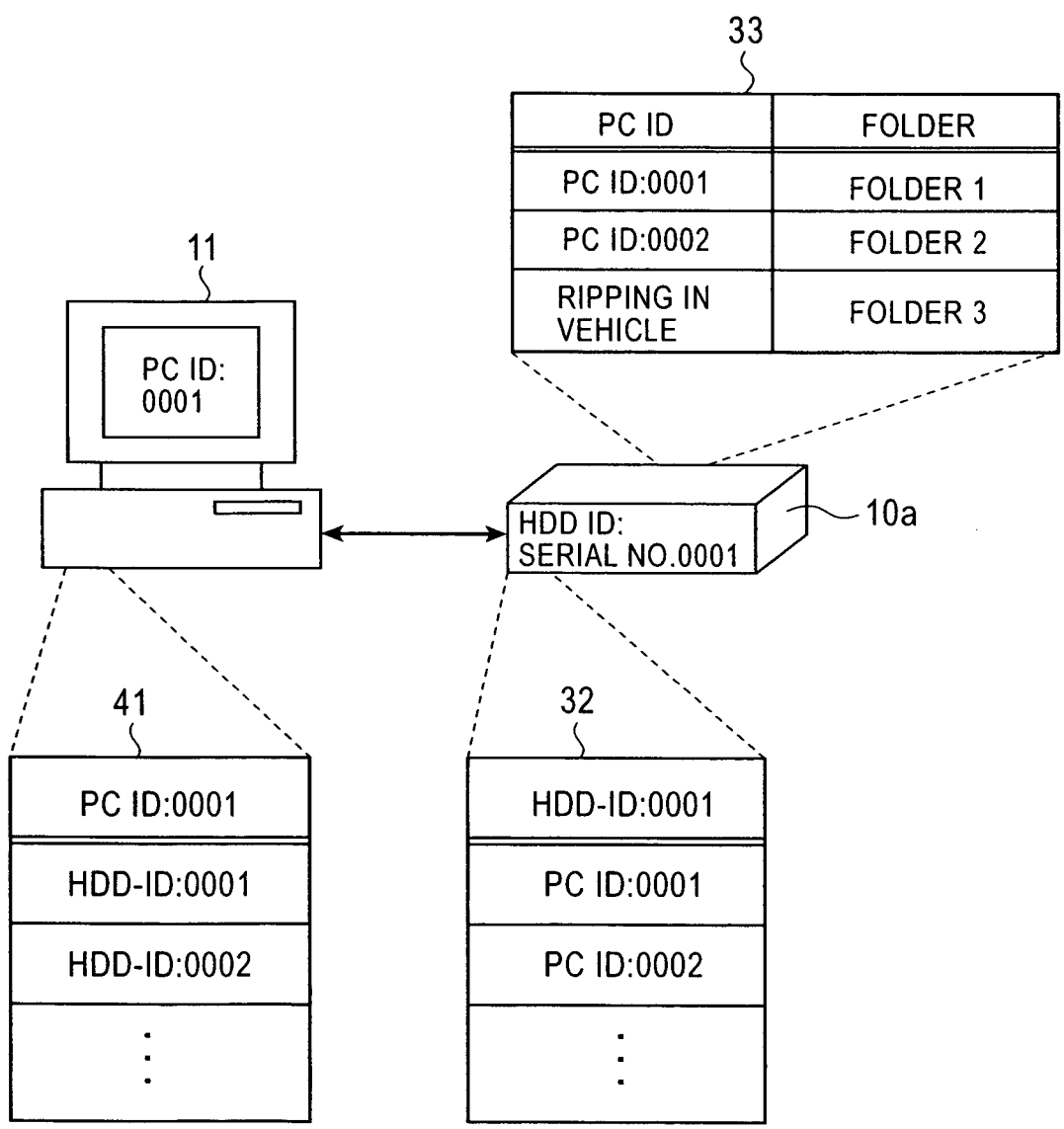
FIG. 6 illustrates a removable HDD connected to a PC.

FIG. 6 illustrates the removable HDD 10a connected to the PC 11. In a memory 41 of the PC 11, authentication numbers (HDD ID Serial No. 0001 and HDD ID Serial No. 0002) of the removable HDDs that have been connected to the PC 11 are stored. Authentication numbers (PC ID: 0001 and PC ID: 0002) of PCs that have been connected to the removable HDD 10a are stored in the storage device (PID) 32, and the associations between the PCs and folders are stored in the storage device (FOL) 33.

Figure 7:
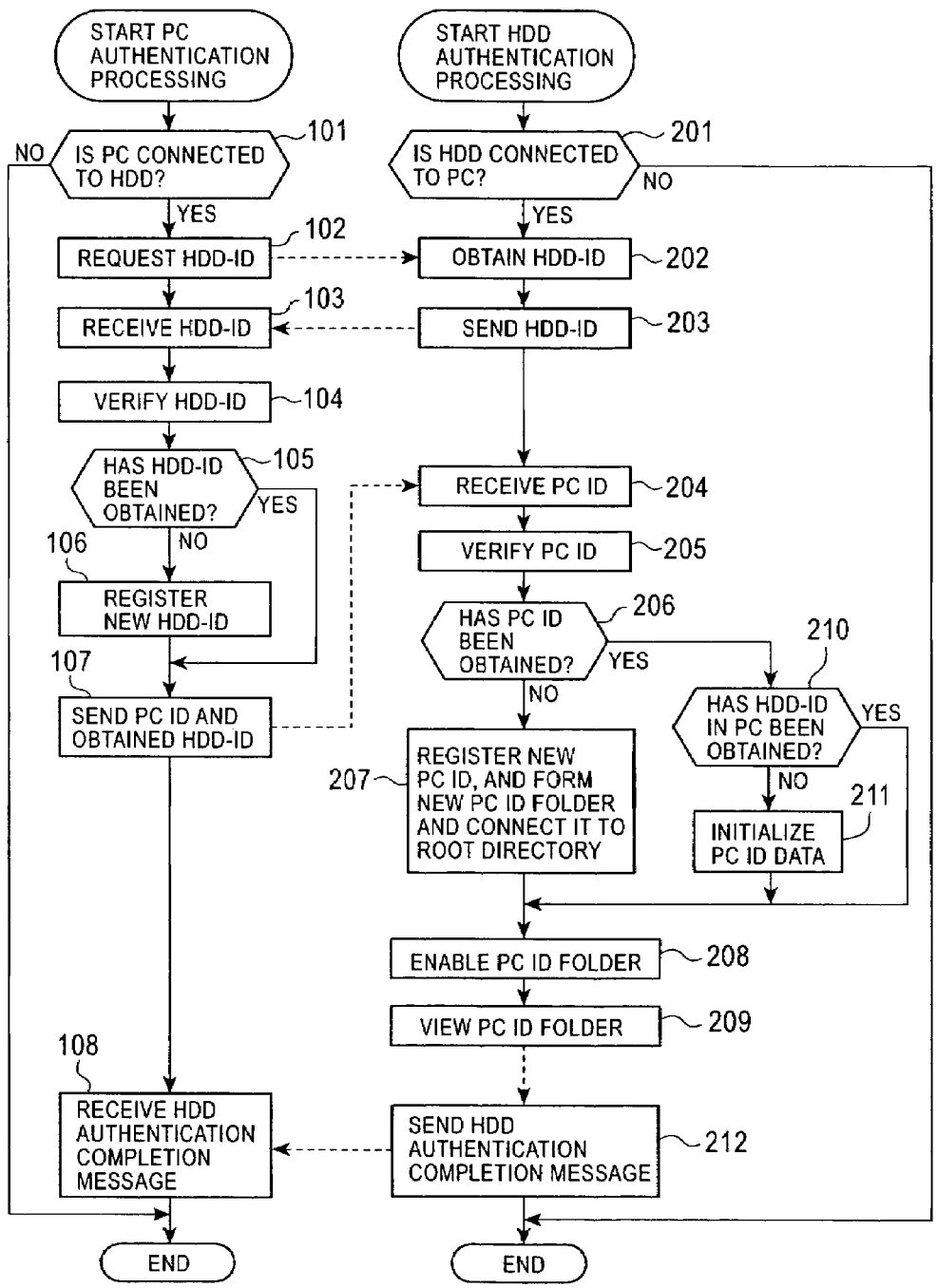
FIG. 7 is a flowchart illustrating authentication processing performed by the PC and the removable HDD according to the first embodiment.

FIG. 7 is a flowchart illustrating authentication processing performed by the PC 11 and the removable HDD 10a in the first embodiment.

In step 101, when the PC 11 is powered on, it is checked whether the PC 11 is connected to a removable HDD. If the outcome of step 101 is YES, the process proceeds to step 102 in which the PC 11 requests the removable HDD (in this case, removable HDD 10a) to send the authentication number (HDD-ID) of the removable HDD 10a. Upon receiving the authentication number (HDD-ID) from the removable HDD 10a in step 103, the PC 11 checks the received authentication number against the authentication number stored in the memory 41 (FIG. 6) in step 104 to determine in step 105 whether the authentication number has been obtained. If the authentication number has not been obtained, it is registered in the memory 41 in step 106. After the authentication number is stored in step 106 or if it is found in step 105 that the authentication number has been obtained, the process proceeds to step 107. In step 107, the PC 11 sends the PC authentication number (PC ID) and the HDD-ID stored in the memory 41 to the removable HDD 10a.

Thereafter, upon receiving an HDD authentication completion message from the removable HDD 10a in step 108, the PC authentication processing is completed.

Meanwhile, the processor (CPU1) 23 (FIG. 3) of the removable HDD 10a checks in step 201 whether it is connected to a processing unit, such as PC. If the removable HDD 10a is connected to a PC (for example, PC 11), it waits for a request to send the authentication number (HDD-ID). When receiving a request, the removable HDD 10a obtains the authentication number (HDD-ID) from the storage device (PID) 32 of the memory 25 in step 202, and sends it to the PC 11 in step 203. Then, upon receiving the PC authentication number (PC ID) from the PC 11 in step 204, in step 205, the removable HDD 10a checks the received PC authentication number against the authentication number stored in the storage device (PID) 32 of the memory 25 to determine in step 206 whether the authentication number (PC ID) has been obtained. If the authentication number has not been obtained, in other words, if the removable HDD 10a is connected to the PC 11 for the first time, the process proceeds to step 207. In step 207, the removable HDD 10a stores the PC authentication No. (PC ID) in the storage device (PID) 32. The removable HDD 10a also defines a folder of the PC 11 and connects it to the root directory, and also stores the association between the PC authentication number (PC ID) and the folder in the storage device (FOL) 33. The folder is enabled in step 208 and is viewed in step 209.

If it is found in step 206 that the PC authentication number (PC ID) has been obtained, the removable HDD 10a checks in step 207 whether the HDD-ID stored in the PC 11 received from the PC 11 in step 204 has been obtained. If the HDD-ID has been obtained, the removable HDD 10a determines that no error has occurred. However, if the HDD-ID has not been obtained, the removable HDD 10a determines that an error has occurred, and initializes all the files belonging to the folder of the PC 11 in step 211 to prevent copyright violation. After steps 210 and 211, the folder corresponding to the PC authentication number (PC ID) is obtained from the storage device (FOL) 33. The folder is then enabled in step 208 and is viewed in step 209.

Then, the removable HDD 10a sends an HDD authentication completion message in step 212 to complete the authentication processing.

Figure 8:
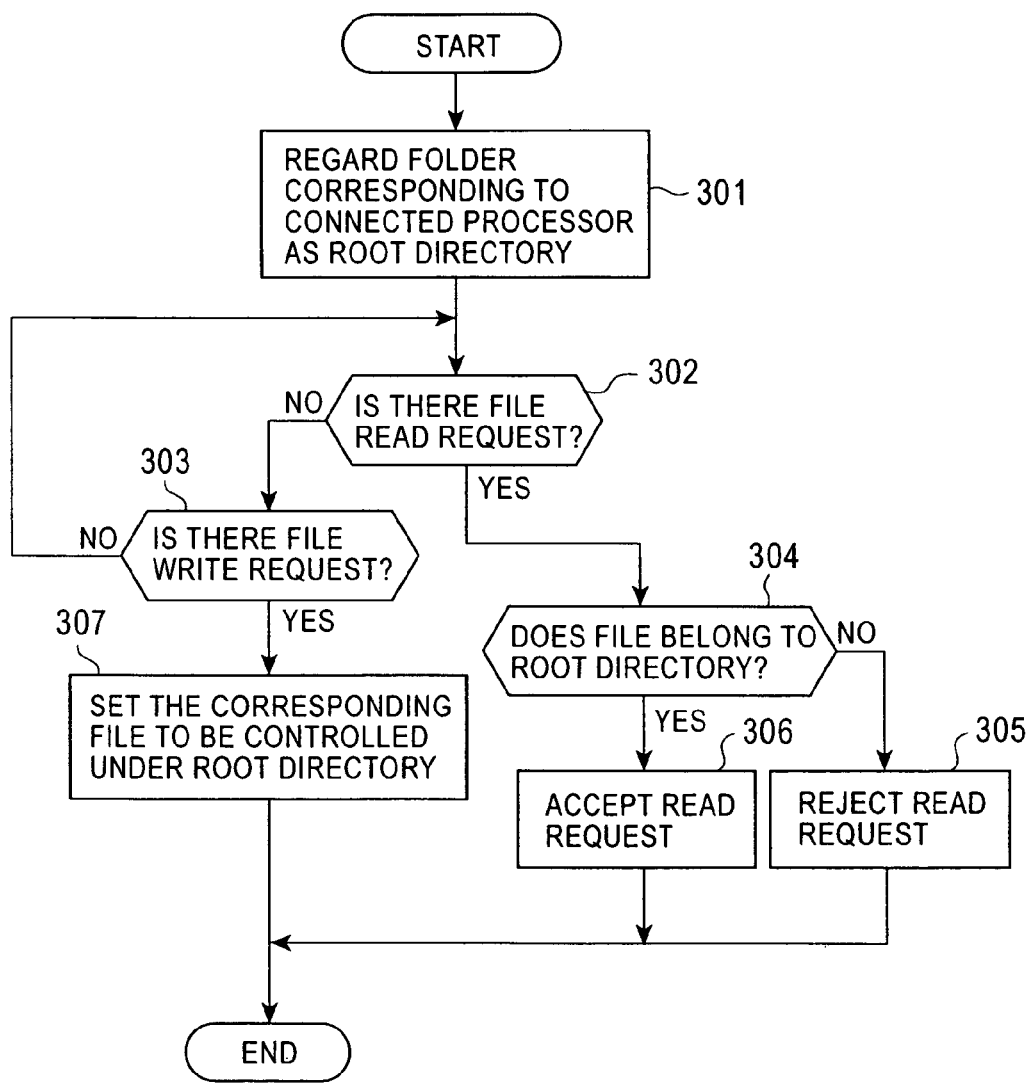
FIG. 8 is a flowchart illustrating a control process for viewing files by the removable HDD.

FIG. 8 is a flowchart illustrating a viewing process performed by the removable HDD 10a.

The processor (CPU1) 23 of a removable HDD obtains a folder (folder 11) corresponding to the PC 11 connected to the removable HDD 10a from the storage device (FOL) 33 and views it. That is, in step 301, the processor 23 regards the folder 1 as the root directory in a virtual manner. Then, in step 302, the removable HDD 10a checks for a request to read a file from the PC 11. If there is no request to read a file, in step 303, the removable HDD 10a checks for a request to write a file from the PC 11. If there is a request to read a file in step 302, the removable HDD 10a checks in step 304 whether the requested file belongs to the root directory. If the answer of step 304 is NO, the removable HDD 10a rejects the read request in step 305. If the file belongs to the root directory, the removable HDD 10a accepts the read request to read the file from the HDD portion 21 and sends it to the PC 11 in step 306.

If there is a write request in step 303, the removable HDD 10a controls the requested file to be under the root directory in step 307.

According to the first embodiment, a processing unit (PC) cannot access files on a removable recording medium recorded by other processing units, thereby preventing copyright protection problems. The processing units can use desired removable recording media, and unlike the related art, the setting of authentication relationships is not necessary, thereby improving the operability. Additionally, each processing unit can write files recorded on a plurality of recording media into the processing unit and process them while ensuring copyright protection.

Second Embodiment

In the first embodiment, a folder corresponding to the PC is connected to the root directory, and each PC can access files in the folder for that PC. In a second embodiment, an HDD is partitioned, and then the partitions are assigned to corresponding PCs, thereby allowing each PC to access files in the assigned partition.

Figure 9:
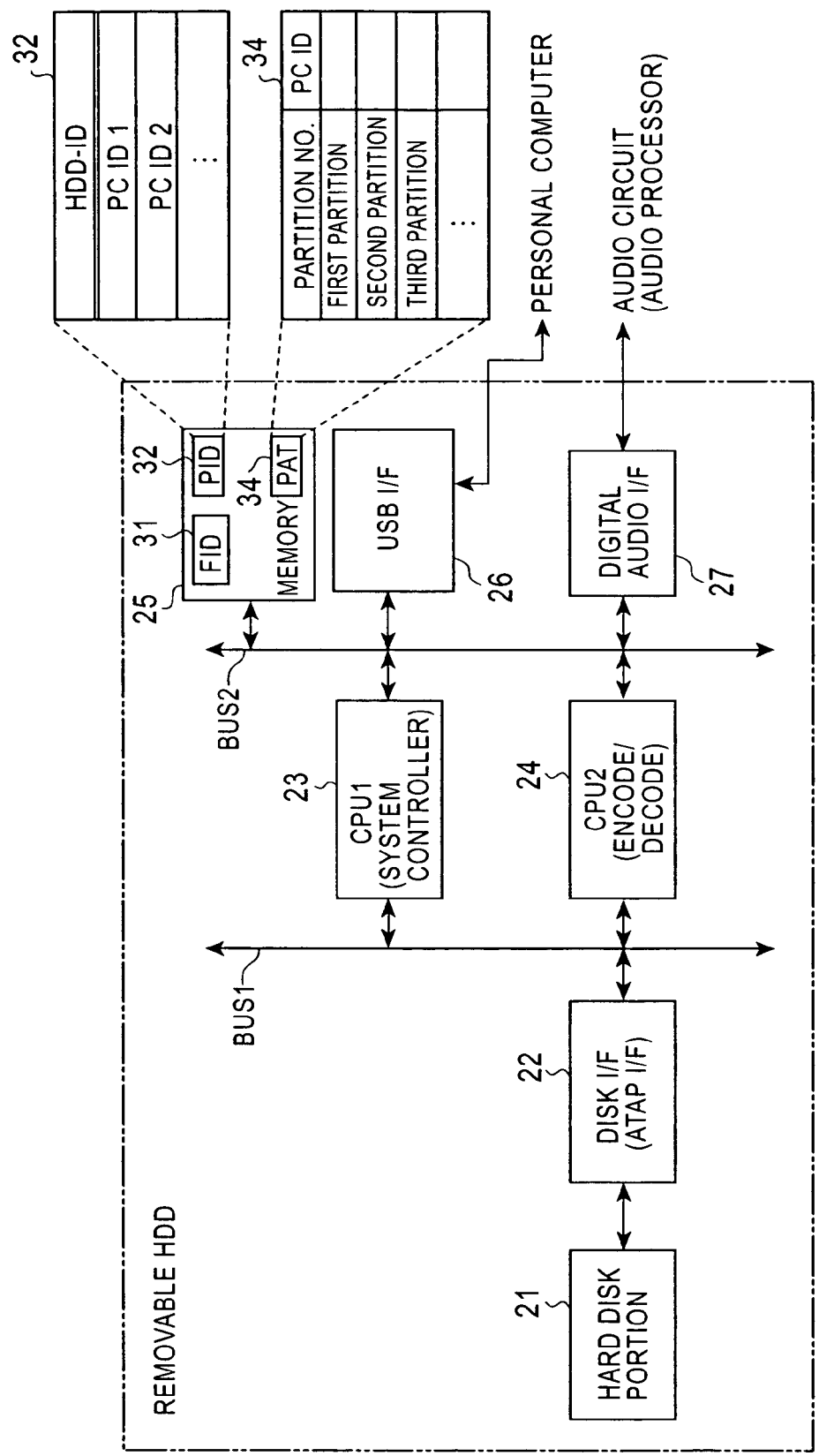
FIG. 9 illustrates a removable HDD of a second embodiment of the present invention.

FIG. 9 is a block diagram illustrating a removable HDD of the second embodiment. In FIG. 9, the same elements as those of the removable HDD of the first embodiment shown in FIG. 3 are designated with like reference numerals. The second embodiment differs from the first embodiment in that a storage device (PAT) 34 for storing associations between partition numbers and PCs is provided instead of the storage device (FOL) 33 for storing associations between PC authentication numbers and folders.

Figure 10:
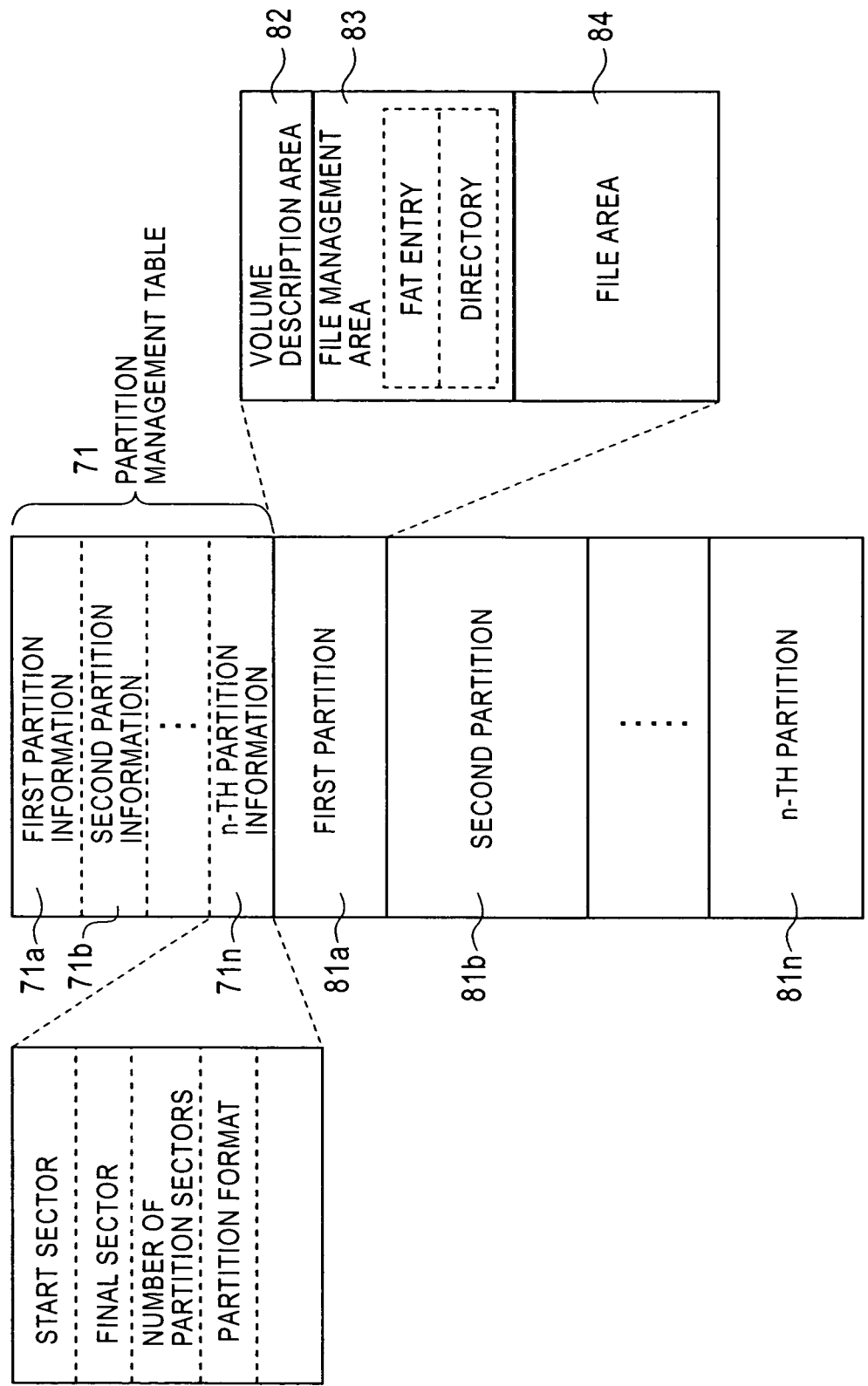
FIG. 10 illustrates partitioning of an HDD.

The HDD portion 21 has been divided, as shown in FIG. 10, into n partitions by partitioning processing. A partition management table 71 has partition information 71a through 71n of n partitions 81a through 81n, respectively. The first through n-th partition information 71a through 71n includes start sectors, final sectors, the number of sectors in the corresponding partitions, and format information in the corresponding partitions. Each of the partitions 81a through 81n includes a volume description area 82 for storing information required for managing files in the corresponding partition, a file management area 83 storing a file allocation table (FAT) and a directory, and a file area 84 into which files are written.

Figure 11:
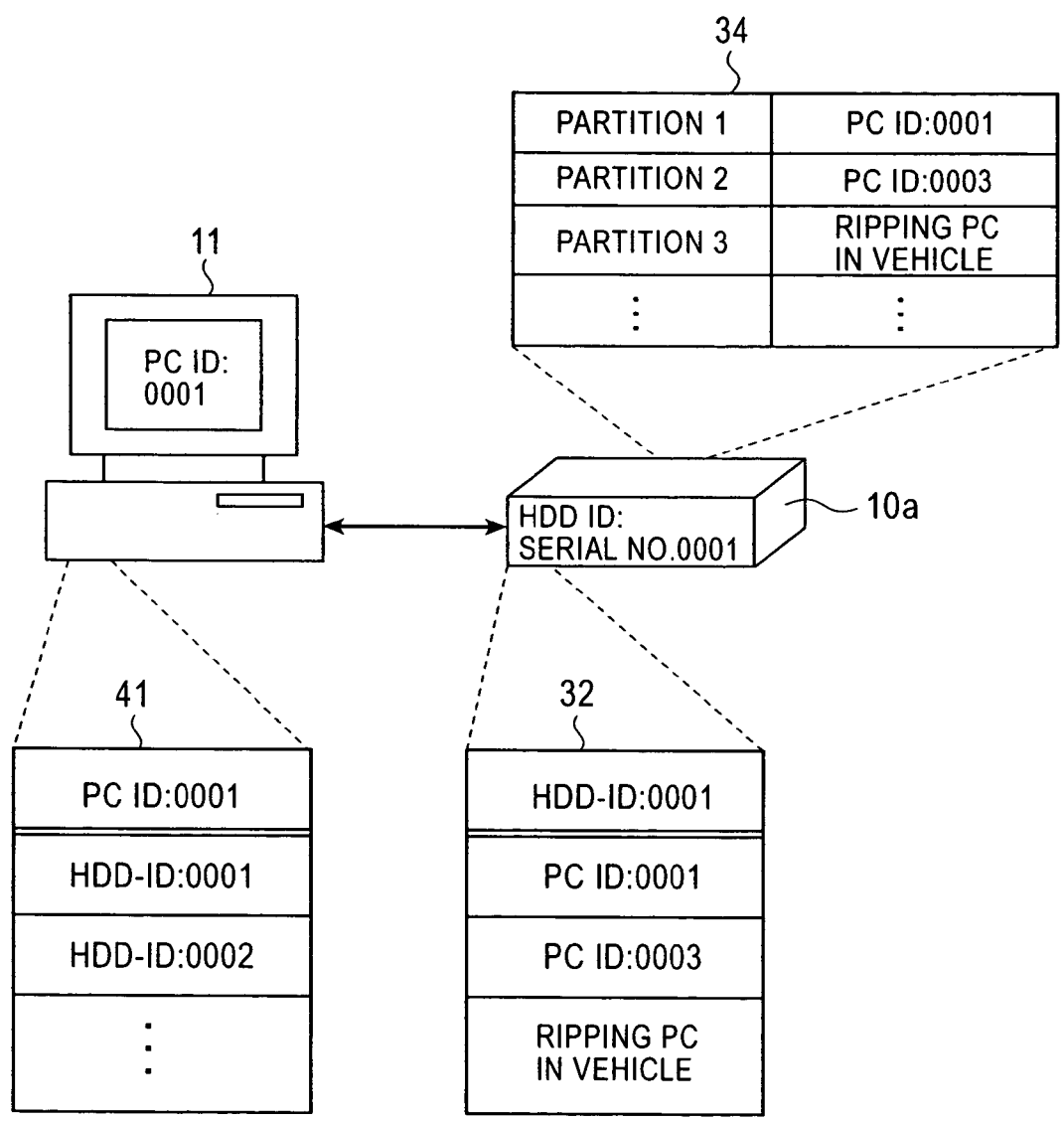
FIG. 11 illustrates a partitioned removable HDD connected to a PC.

FIG. 11 illustrates the partitioned removable HDD 10a connected to the PC 11. In the memory 41 of the PC 11, the authentication numbers (HDD ID Serial No. 0001 and HDD ID Serial No. 0002) of previously connected removable HDDs are stored. In the storage device (PID) 32 of the removable HDD 10a, the authentication numbers (PC ID: 0001 and PC ID: 0003) of previously connected PCs are stored. In the storage device (PAT) 34, associations between the partition numbers and PCs are stored.

Figure 12:
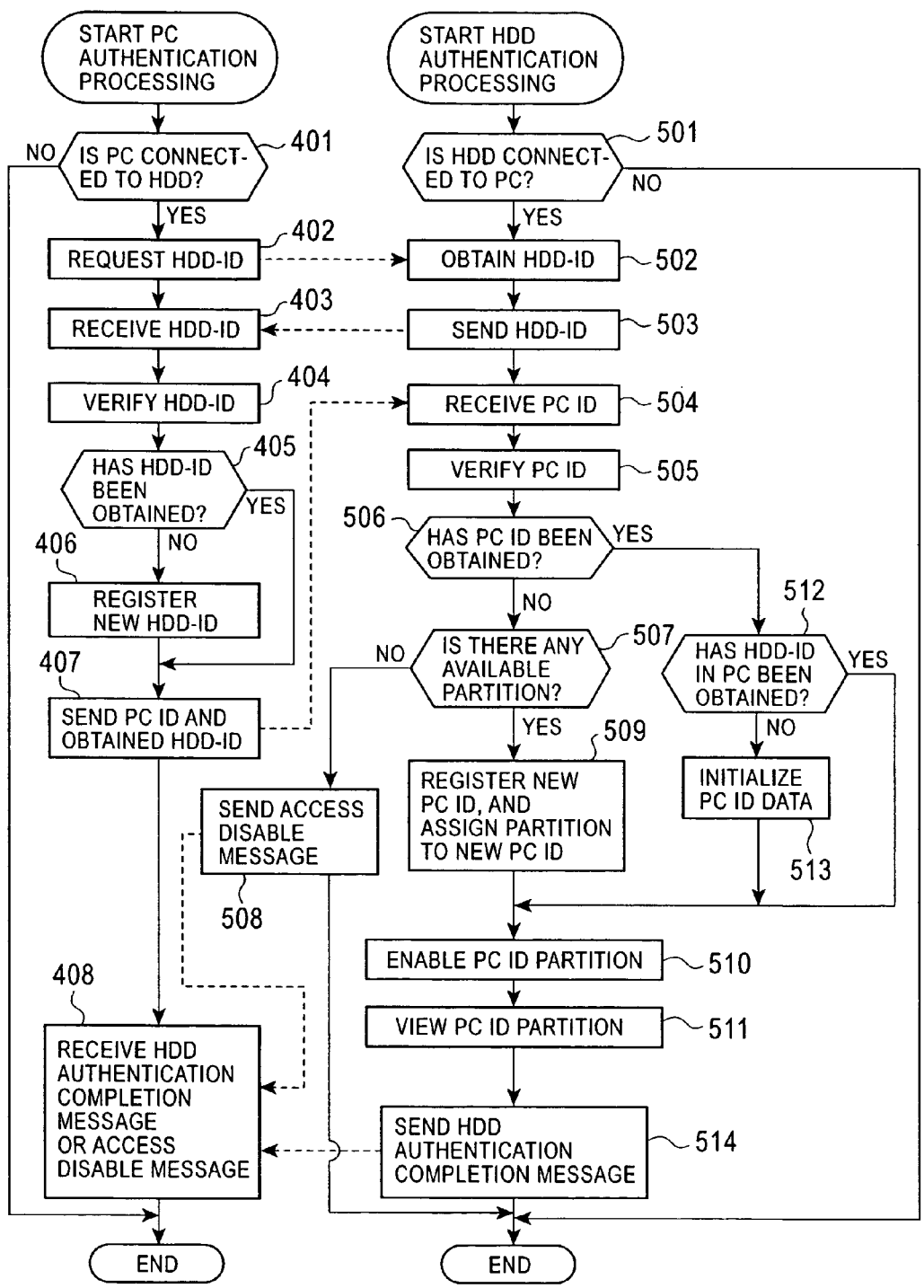
FIG. 12 is a flowchart illustrating authentication processing performed by the PC and the removable HDD according to the second embodiment.
Figure 13:
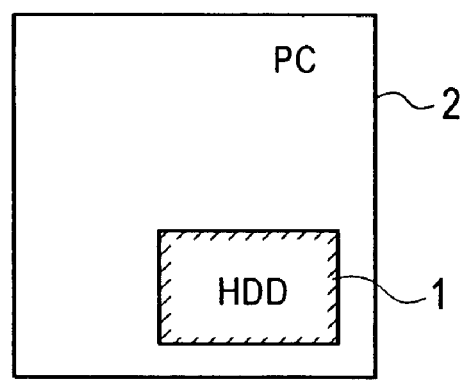
FIG. 13 illustrates an HDD installed in a PC according to the related art.
Figure 14:
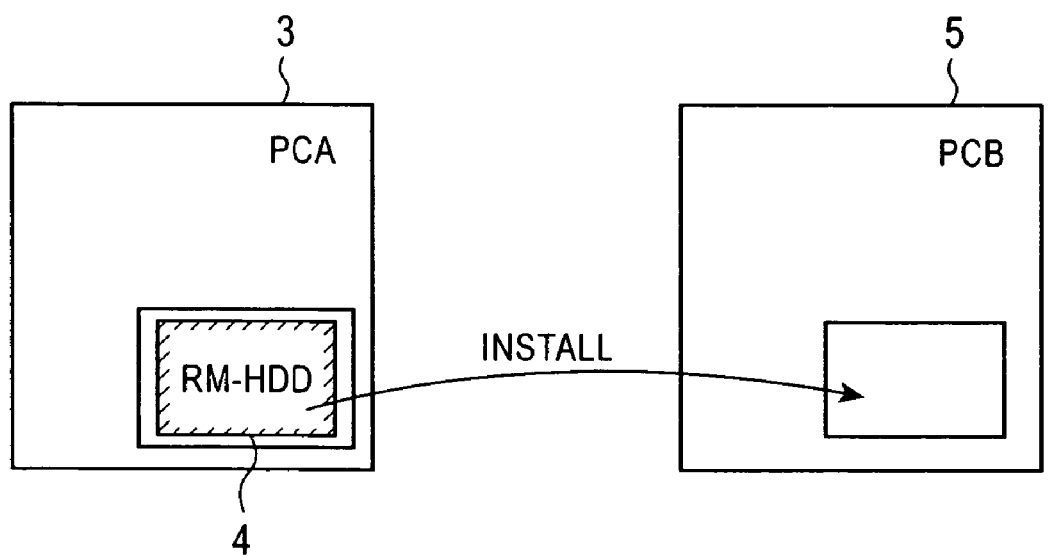
FIG. 14 illustrates a problem of copyright protection caused by a removable HDD.
Figure 15A:
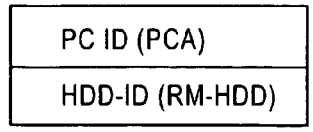
FIGS. 15A through 15D illustrate a one-to-one authentication method.
Figure 15C:
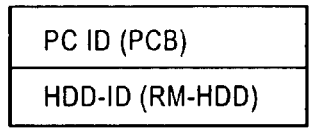
Figure 15B:
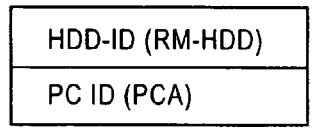
Figure 15D:
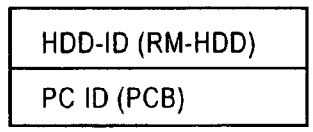
Figure 16:
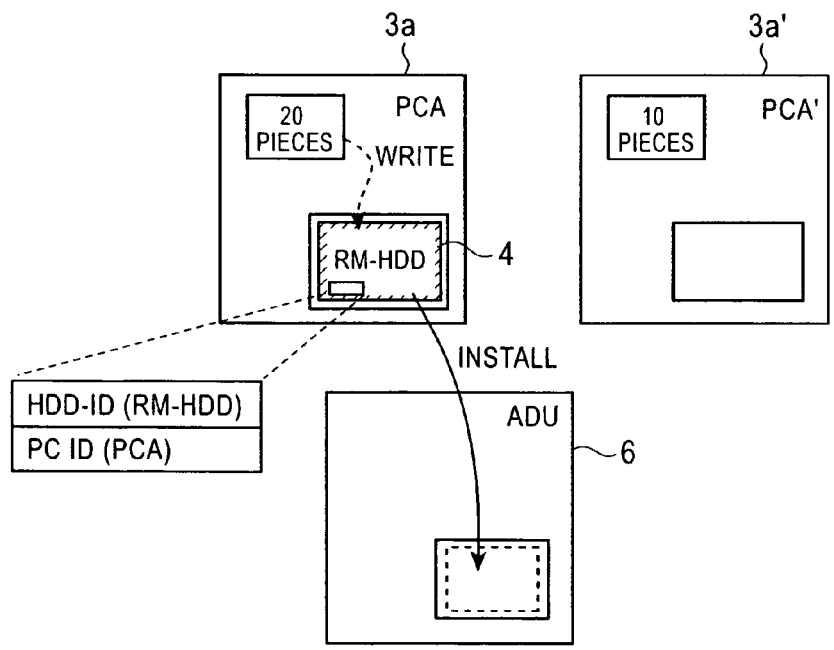
FIG. 16 illustrates a problem caused by the one-to-one authentication method.
Figure 17:
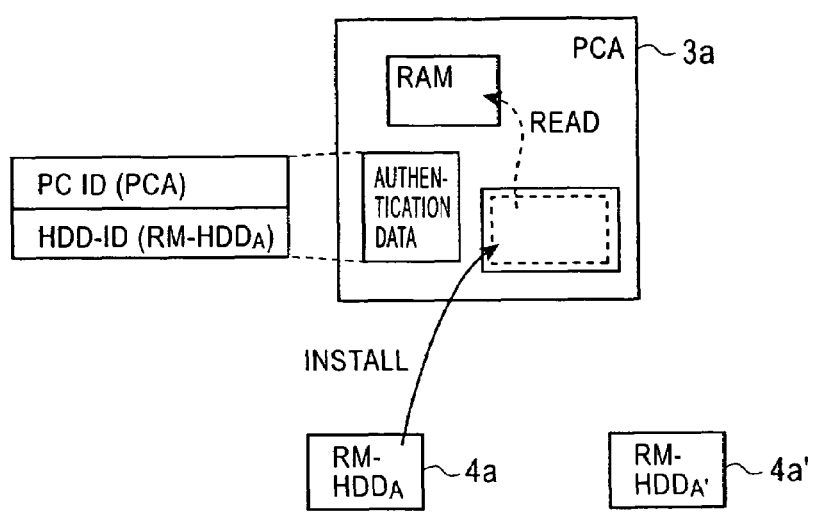
FIG. 17 illustrates another problem caused by the one-to-one authentication method.
Figure 18A:
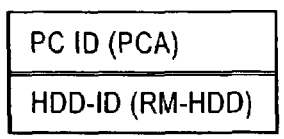
FIGS. 18A through 18C illustrates a one-to-many authentication method.
Figure 18B:
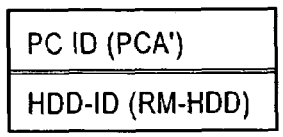
Figure 18C:
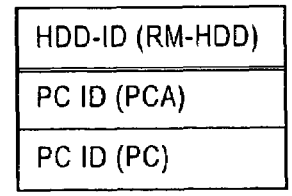
Figure 19:
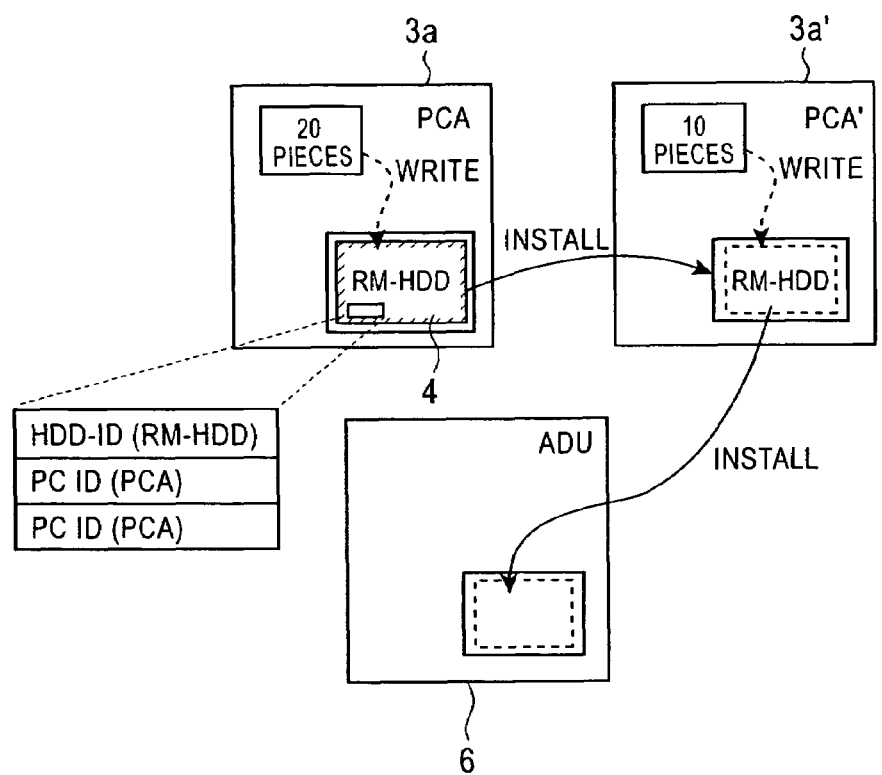
FIG. 19 illustrates a problem caused by the one-to-many authentication method.

FIG. 12 is a flowchart illustrating authentication processing performed by the PC 11 and the removable HDD 10a according to the second embodiment of the present invention.

In step 401, when the PC 11 is powered on, it is checked whether the PC 11 is connected to a removable HDD. If the PC 11 is connected to a removable HDD (in this case, the removable HDD 10a), it requests the removable HDD 10a to send the authentication number (HDD-ID) in step 402. Upon receiving the HDD authentication number in step 403, in step 404, the PC 11 checks the authentication number against the authentication number stored in the memory 41 to determine in step 405 whether the authentication number has been obtained. If the answer of step 405 is NO, the received authentication number is stored in the memory 41 in step 406. After step 406, or if the outcome of step 405 is YES, i.e., the authentication number has been obtained, the PC 11 sends the PC authentication number (PC ID) and the HDD-ID stored in the memory 41 to the removable HDD 10a in step 407.

Thereafter, upon receiving an HDD authentication completion message or an access disable message in step 408, the authentication processing by the PC 11 is completed.

Meanwhile, in step 501, the processor (CPU1) 23 (FIG. 9) of the removable HDD 10a checks whether the removable HDD 10a is connected to a processing unit, such as a PC. If the removable HDD 10a is connected to a PC (in this case, PC 11), it waits for a request to send the authentication number. Upon receiving a request, the removable HDD 10a obtains the authentication number (HDD-ID) from the storage unit (PID) 32 of the memory 25 in step 502, and sends it to the PC in step 503. Then, upon receiving the authentication number (PI ID) from the PC 11 in step 504, in step 505, the removable HDD 10a checks the received PC ID against the PC ID stored in the storage device (PID) 32 of the memory 25 to determine in step 506 whether the PC ID has been obtained. If the PC ID has not been obtained, in other words, if the removable HDD 10a is connected to the PC 11 for the first time, the removable HDD 10a checks for an available partition in step 507. If there is no available partition, the removable HDD 10a sends an access disable message to the PC 11 in step 508 to complete the authentication processing.

If it is found in step 507 that there is an available partition, the process proceeds to step 509. In step 509, the removable HDD 10a stores the authentication number (PC ID) of the PC 11 in the storage device 32 and also reserves a partition for the PC 11. The removable HDD 10a also stores the association between the PC authentication number (PC ID) and the partition number in the storage device 34. The partition is enabled in step 510 and is viewed in step 511. To view a partition is to allow a processing unit to read files only in the designated partition and to write files into that partition.

If it is found in step 506 that the PC authentication number (PC ID) has been obtained, the removable HDD 10a checks in step 512 whether the HDD-ID stored in the PC 11 received from the PC 11 has been obtained. If the HDD-ID has been obtained, the removable HDD 10a determines that no error has occurred. If the HDD-ID has not been obtained, the removable HDD 10a determines that an error has occurred and in step 513 initializes the partition corresponding to the PC 11 to prevent copyright violation. After steps 512 and 513, the removable HDD 10a obtains the partition corresponding to the PC authentication number (PC ID) from the storage device 34. The partition is then enabled in step 510 and is viewed in step 511.

Upon completing the viewing processing in step 511, the removable HDD 10a sends an HDD authentication completion message to the PC 11 in step 514 to complete the authentication processing.

According to the second embodiment, a processing unit (PC) cannot access files on a removable recording medium recorded by other processing units, thereby preventing copyright protection problems. The processing units can use desired removable recording media, and unlike the related art, the setting of authentication relationships is not necessary, thereby improving the operability. Additionally, each processing unit can write files recorded on a plurality of recording media into the processing unit and process them while ensuring copyright protection.

Although in the first and second embodiments removable HDDs are used, removable semiconductor storage devices or small, exchangeable, and portable semiconductor storage cards, such as memory sticks, may be used.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A file control method for a removable recording medium including a recording medium portion and a controller for executing a file access control on the recording medium portion, the file control method comprising:

connecting the removable recording medium exclusively to a processing unit;

storing a file structure of the recording medium portion in the removable recording medium in a directory format and writing a first folder for the processing unit into the file structure; and performing viewing control with the controller of the removable recording medium when the removable recording medium is exclusively connected to the processing unit so as to allow the processing unit to access files belonging to the first folder corresponding to the processing unit while prohibiting the processing unit from accessing files of a second folder of the file structure that is associated with another processing unit, and to write files created by the processing unit to the first folder.

2. The file control method according to claim 1, wherein performing viewing control comprises:
   checking an ID of the processing unit when the removable recording medium is connected to the processing unit; and
   viewing the folder corresponding to the processing unit when the ID has been obtained or defining, when the ID has not been obtained, a new folder corresponding to the processing unit and associating the new folder with a root directory of the file structure so as to view the new folder.

3. The file control method according to claim 2, wherein an association between the ID of the processing unit and the folder is stored.

4. The file control method according to claim 1, wherein the viewing control is performed based on the folder corresponding to the processing unit as a root directory in a virtual manner.

5. The file control method according to claim 1, wherein the processing unit is an on-vehicle audio processor, and an association between the on-vehicle audio processor and a corresponding folder is stored in advance.

6. The file control method according to claim 1, wherein the removable recording medium is a removable hard disk.

7. The file control method of claim 1, wherein the files comprise music data and wherein the controller performs viewing control to allow the processing unit to use only files belonging to the folder corresponding to the processing unit to provide copyright protection.

8. The file control method of claim 1, wherein performing viewing control comprises:
   checking an ID of the processing unit when the removable recording medium is connected to the processing unit; and
   viewing the folder corresponding to the processing unit when the ID has been obtained or defining, when the ID has not been obtained, a new folder corresponding to the processing unit and associating the new folder with a root directory of the file structure so as to view the new folder;
   wherein the viewing control is performed based on the folder corresponding to the processing unit as a root directory in a virtual manner.

9. A file control method for a removable recording medium including a recording medium portion and a controller for executing a file access control on the recording medium portion, the file control method comprising:
   dividing the removable recording medium into a plurality of partitions;
   assigning a first partition of the plurality of partitions to a first processing unit;
   assigning a second partition of the plurality of partitions to a second processing unit;
   connecting the removable recording medium exclusively to the first processing unit; and
   performing viewing control with the controller of the removable recording medium when the removable recording medium is connected to the first processing unit to allow the first processing unit to access files stored in the assigned first partition while prohibiting the first processing unit from accessing files stored in the assigned second partition, and to store files created by the first processing unit in the assigned first partition.

10. The file control method according to claim 9, wherein performing viewing control comprises:
    checking an ID of the first processing unit when the removable recording medium is connected to the first processing unit; and
    viewing the first partition assigned to the first processing unit when the ID has been obtained.

11. The file control method according to claim 10, wherein an association between the ID of the first processing unit and the assigned first partition is stored.

12. The file control method according to claim 9, wherein the removable recording medium is a removable hard disk.

13. The file control method according to claim 9, wherein the first processing unit is an on-vehicle audio processor, and an association between the on-vehicle audio processor and a partition assigned to the on-vehicle audio processor is stored in advance.

14. A removable recording medium attachable to and detachable from a processing unit, the removable recording medium comprising:
    a recording medium portion storing a file therein;
    means for dividing the recording medium portion into a plurality of partitions, for assigning a first partition of the plurality of partitions to a first processing unit, and for assigning a second partition of the plurality of partitions to a second processing unit;
    storage means for storing an association between a processing unit and a partition assigned to the processing unit therein; and
    viewing control means for performing viewing control when the removable recording medium is exclusively connected to the first processing unit so as to allow the first processing unit to access files stored in the assigned first partition while prohibiting the first processing unit from accessing files stored in the assigned second partition, and to store files created by the first processing unit in the assigned first partition.

15. The file control method of claim 9, wherein the files comprise music data and wherein the controller performs viewing control to allow the first processing unit to use only files stored in the assigned first partition to provide copyright protection.

16. The file control method of claim 9, wherein performing viewing control comprises:
    checking an ID of the first processing unit when the removable recording medium is connected to the first processing unit; and
    viewing the first partition assigned to the first processing unit when the ID has been obtained;
    wherein the viewing control is performed based on the partition corresponding to the first processing unit as a root directory in a virtual manner.

17. A removable recording medium attachable to and detachable from a processing unit, the removable recording medium comprising:
    a recording medium portion storing a file therein;
    means for storing a file structure of the recording medium portion in the recording medium portion in a directory format and for writing a folder for a processing unit into the file structure;
    storage means for storing an association between a processing unit and a corresponding folder therein; and
    viewing control means for performing viewing control when the removable recording medium is exclusively connected to the processing unit so as to allow the processing unit to access files belonging to the folder corresponding to the processing unit while prohibiting the processing unit from accessing files belong to other folders of the recording medium belonging to other processing units, and to write files created by the processing unit to the folder belonging to the processing unit.

18. The removable recording medium according to claim 17, wherein the viewing control means performs the viewing control based on the folder corresponding to the processing unit as a root directory in a virtual manner.

19. The removable recording medium according to claim 17, wherein the viewing control means comprises:
means for checking an ID of the processing unit when the removable recording medium is connected to the processing unit;
means for viewing the folder corresponding to the processing unit when the ID has been obtained; and
means for defining, when the ID has not been obtained, a new folder corresponding to the processing unit and connecting the new folder to a root directory of the file structure so as to view the new folder.

20. The removable recording medium according to claim 17, wherein the processing unit is an on-vehicle audio processor, and an association between the on-vehicle audio processor and a corresponding folder is stored in the storage means in advance.

21. The removable recording medium according to claim 17, wherein the recording medium portion is a hard disk.

22. The removable recording medium of claim 17, wherein the viewing control means comprises:
means for checking an ID of the processing unit when the removable recording medium is connected to the processing unit;
means for viewing the folder corresponding to the processing unit when the ID has been obtained; and
means for defining, when the ID has not been obtained, a new folder corresponding to the processing unit and connecting the new folder to a root directory of the file structure so as to view the new folder;
wherein the viewing control is performed based on the folder corresponding to the processing unit as a root directory in a virtual manner.

23. The removable recording medium of claim 17, wherein the files comprise music data and the viewing control means performs viewing control to allow the processing unit to use only files stored in the folder corresponding to the processing unit to provide copyright protection.

24. The removable recording medium according to claim 14, wherein the viewing control means comprises:
means for checking an ID of the processing unit when the removable recording medium is connected to the processing unit;
means for viewing the partition assigned to the processing unit when the ID has been obtained; and
means for assigning an available partition to the processing unit when the ID has not been obtained so as to view the assigned partition.

25. The removable recording medium according to claim 24, wherein the viewing control means rejects a file access made from the processing unit when there is no available partition.

26. The removable recording medium according to claim 14, wherein the recording medium portion is a hard disk.

27. The removable recording medium according to claim 14, wherein the first processing unit is an on-vehicle audio processor, and an association between the on-vehicle audio processor and a partition assigned to the on-vehicle audio processor is stored in the storage means in advance.

28. The removable recording medium of claim 14, wherein the files comprise music data and the viewing control means performs viewing control to allow the first processing unit to use only files stored in the assigned partition to provide copyright protection.

29. The removable recording medium of claim 14, wherein the viewing control means comprises:
means for checking an ID of the first processing unit when the removable recording medium is connected to the first processing unit;
means for viewing the first partition assigned to the first processing unit when the ID has been obtained; and
wherein the viewing control is performed based on the partition corresponding to the first processing unit as a root directory in a virtual manner.

* * * * *